United States Patent

Vuillemenot

[15] 3,676,355
[45] July 11, 1972

[54] STABILIZATION OF 1,1,1,TRICHLOROETHANE WITH OXAZOLE

[72] Inventor: Jacques Vuillemenot, Uriage-les-Bains, France

[73] Assignee: Ugine Kuhlmann, Paris, France

[22] Filed: Dec. 19, 1968

[21] Appl. No.: 785,372

[30] Foreign Application Priority Data

Dec. 22, 1967 France..............................67133564

[52] U.S. Cl...............................252/153, 252/171, 252/172, 252/364, 252/403, 260/652.5
[51] Int. Cl.....................C07d 17/40, C11d 7/50, C23g 5/02
[58] Field of Search..................252/153, 162, 170, 171, 172, 252/364, 403; 260/652.5

[56] References Cited

UNITED STATES PATENTS

| | | | |
|---|---|---|---|
| 3,499,047 | 3/1970 | Cormany et al. | 260/652.5 |
| 3,494,968 | 2/1970 | Archer et al. | 260/652.5 |
| 3,192,273 | 6/1965 | Bissinger | 260/652.5 |
| 2,947,792 | 8/1960 | Skeeters | 260/652.5 |
| 2,944,088 | 7/1960 | Kauder | 260/652.5 |
| 2,517,893 | 8/1950 | Larchar | 252/171 |

*Primary Examiner*—Herbert B. Guynn
*Assistant Examiner*—Dennis L. Albrecht
*Attorney*—Pennie, Edmonds, Morton, Taylor and Adams

[57] ABSTRACT

1,1,1, trichlorethane, an industrial solvent, is stabilized to prevent its reaction with metals by the addition thereto of from about 0.2 percent to 10 percent of a stabilizing agent comprising oxazole either alone or in combination with one or more other stabilizers having a boiling point in the range from 40° C. to 200° C. and having a molecular structure which comprises at least one of the molecular groups consisting of ethylenic bond, acetylenic bond, acetal, ketone, alcohol, nitrile, amine, ester function, ether or tioether bond-bridge, nitrated group and 1,2-epoxy group.

5 Claims, No Drawings

STABILIZATION OF 1,1,1,TRICHLOROETHANE WITH OXAZOLE

BACKGROUND OF THE INVENTION

I. Field of the Invention

This invention relates to a method for the stabilization of 1,1,1, trichlorethane and the product produced thereby. In particular, it relates to the stabilization of 1,1,1, trichlorethane, an industrial solvent, by the addition thereto of oxazole, either alone or in combination with other stabilizing agents.

II. Description of the Prior Art 1,1,1, trichlorethane, or methylchloroform, is an industrial solvent having high dissolving power and flame-resistant properties; it is used as a propellant in aerosols and also for degreasing metallic pieces. Despite its excellent properties as an industrial solvent, 1,1,1, trichlorethane has the serious limitation of being much more reactive with respect to metals than other chlorinated hydrocarbons such as chloroform, carbon tetrachloride, trichlorethylene or perchlorethylene. This reactivity is particularly important with respect to light metals such as aluminum, magnesium or their alloys and results in a rapid attack on the metal and a strong decomposition of the solvent.

In order to lessen its reactivity, stabilizing substances have been added to 1,1,1, trichlorethane; generally, these substances, which are effective with other chlorinated hydrocarbons, have a very poor efficiency with respect to 1,1,1, trichlorethane. Specifically, no stabilizing substance heretofore known has been capable of satisfactorily stabilizing this compound when it is in contact with aluminum. The present invention provides a material which effectively and efficiently stabilizes 1,1,1, trichlorethane. This stabilizing agent which is comprised of oxazole, either alone or in combination with certain other stabilizing agents, has been found to effectively stabilize 1,1,1, trichlorethane even when the latter is at its boiling temperature and in contact with aluminum.

SUMMARY OF THE INVENTION

The present invention is based on the discovery that 1,1,1, trichlorethane, an industrial solvent which is an effective degreasing agent, can be stabilized against reaction with light metals such as aluminum, magnesium or their alloys with the resultant decomposition of the solvent, by the addition thereto of oxazole, either by itself or in combination with certain other stabilizing agents. Broadly stated, this invention comprises the stabilization of 1,1,1, trichlorethane by the addition thereto of from about 0.2 percent to 10 percent of a stabilizing agent which comprises oxazole, either by itself or in combination with one or more other stabilizers having a boiling point in the range from 40° C. to 200° C. and having a molecular structure which comprises at least one of the molecular groups consisting of ethylenic bond, acetylenic bond, acetal, ketone, alcohol, nitrile, amine, ester functions, ether or tioether bond-bridge, nitrated group and 1,2-epoxy group Oxazole is a colorless liquid with a boiling point of 69° C. – 70° C. under 760 mm. Hg, a relative density $d25/4=1.0,808$ and a refractive index $\eta25/D= 1.4,245$. Oxazole has a structural formula as follows:

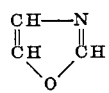

The stabilizing agent in accordance with this invention is added to 1,1,1, trichlorethane in an amount which may vary from 0.2 percent to 10 percent by weight. However, concentrations varying from between 2 percent to 6 percent by weight are preferable. These weight percentages of the stabilizing agent include both the oxazole and any other components thereof. Within the stabilizing agent itself, the oxazole content may vary from between 1 percent and 99 percent by weight thereof. As previously stated, the stabilizing agent may contain stabilizers other than oxazole; however, these should be chosen from among stabilizing compounds which have a boiling point in the range from 40° C. to 200° C. and preferably between 50° C. and 130° C.

The stabilizing agent of the present invention, when added to 1,1,1, trichlorethane, results in a stabilized solvent which is not only stable against a reaction with metals but is also storage stable.

DESCRIPTION OF THE PREFERRED PRACTICE OF THE INVENTION

The stabilizing agent of the present invention comprises oxazole, either by itself or in combination with certain other stabilizers such as, for example, 1,2-epoxy butane, nitromethane, tertiary butanol and ethyl acetate. The stabilizing agent may be added to the 1,1,1, trichlorethane (methylchloroform) in an amount varying from between about 0.2 percent to 10 percent by weight thereof but is preferably added in an amount of from about 2 percent to 6 percent by weight. The efficiency of stabilization of the system with respect to the 1,1,1, trichlorethane is determined by means of the test used by the "National Institute of Dry Cleaners," 3-55 specification, which was perfected for use with the compound trichlorethylene.

The aforesaid test comprises the introduction of 150 ml. of pure methylchloroform and a stabilizing agent into a 300 ml. flask surmounted by a Soxhlet extractor, having a volume of approximately 70 ml., and a cooling condenser, Allihn bulb type, having a pickling brine circulation at $-15°$ C. The flask is adapted to include a tapered tube through which wet air is allowed to enter, while the gases evolving at the top of the Allihn cooling condenser are sent into an Erlenmeyer flask containing pure water. Lastly a 100-watt lamp is placed a few centimeters from the vapor top in the Soxhlet extractor.

Three aluminum plates are then introduced into the system, the first is placed into the flask, the second into the bottom of the Soxhlet and the third plate is suspended at the lower part of the cooling condenser so that solvent vapors condense on this plate. All of the plates, which are identical, are 50 mm. × 10 mm. × 3 mm. in size and have a lengthwise groove of 1 × 1 mm. on one side thereof.

The stabilization test comprises raising the stabilizing agent to be tested to the boiling point for 48 hours while adjusting the heat input so as to cause the composition to flow back at such a rate that the extractor empties every 8–10 minutes. Following this procedure, analyses are carried out to determine the quantity of acid (expressed in HCl) in the flask, determination of the quantity of acidity (expressed in HCl) in the Erlenmeyer flask, and a physical evaluation of the appearance of the aluminum plates.

EXAMPLES

With respect to the stabilization efficiency test described above, the following stabilizing agents were tested:

| Tests Nature | Stabilizing Agents | Composition (% by wt.) | % by weight in the methyl-chloroform |
|---|---|---|---|
| 1 | no stabilizing substance | | 0 |
| 2 | Oxazole | | 4 |
| 3 | 1,2-epoxy butane | 25 | |
| | nitromethane | 25 | 4 |
| | tertiary butanol | 25 | |
| | oxazole | 25 | |
| 4 | 1,2-epoxy butane | 25 | |
| | nitromethane | 25 | |
| | ethyl acetate | 25 | 4 |
| | oxazole | 25 | |
| 5x | 1,2-epoxy butane | 33.3 | |
| | nitromethane | 33.3 | 4 |
| | tertiary butanol | 33.3 | | x Comparison test

The foregoing tests produced the following results:

| Released acidity Tests | Flask | Erlenmeyer | Aluminum plates Flask | Soxhlet | Cooling Condenser |
|---|---|---|---|---|---|
| 1xx | Carbon mass | not determined, but very substantial | large black deposit | | |
| 2 | 0 | 0 | intact | some little gray spots | intact |
| 3 | 0 | 0 | intact | intact | intact |
| 4 | 0 | 0 | intact | intact | intact |
| 5x | 0 | 0 | intact | attack upon the whole surface | faint attack at the lower part | x Comparison Test
xx After a 15 minute heating. The plates in the Soxhlet and the cooling condenser have not been in contact with the solvent.

While the invention has been described hereinabove in terms of a number of examples of the process thereof and the product produced thereby, the invention itself is not limited thereto, but rather comprehends all modifications of and departures from those examples properly falling within the spirit and scope of the appended claims.

I claim:

1. An industrial solvent consisting essentially of a mixture of 1,1,1-trichloroethane and from about 0.2 percent to about 10 percent by weight based on said 1,1,1-trichloroethane, of a stabilizing composition consisting essentially of:
   a. from 1 to 100 percent of oxazole by weight of said stabilizing composition; and
   b. from 0 to 99 percent by weight of said stabilizing composition, of a stabilizing agent selected from the group consisting of 1,2-epoxy-butane, nitromethane, tertiary butanol, ethyl acetate, and mixtures thereof.

2. An industrial solvent according to claim 1 wherein 2 to 6 percent of 1,1,1-trichloroethane by weight consists essentially of the stabilizing composition.

3. An industrial solvent according to claim 1 wherein the stabilizing composition contains 5 percent to 95 percent oxazole by weight of said stabilizing composition.

4. An industrial solvent according to claim 1 wherein the stabilizing composition consists essentially of:
   a. from 1 to 99 percent of oxazole by weight of said stabilizing composition; and
   b. from 1 to 99 percent by weight of said stabilizing composition, of a compound selected from the group consisting of nitromethane, 1, 2 - epoxy - butane, ethyl acetate, and mixtures thereof.

5. An industrial solvent according to claim 1 wherein the stabilizing composition consists essentially of:
   a. from 1 to 99 percent of oxazole by weight of said stabilizing composition; and
   b. from 1 to 99 percent by weight of said stabilizing composition of a compound selected from the group consisting of nitromethane, 1, 2- epoxy - butane, tertiary butanol and mixtures thereof.

* * * * *